United States Patent [19]

Ryuu

[11] Patent Number: 5,881,857
[45] Date of Patent: Mar. 16, 1999

[54] HYDRAULIC FAN COUPLING APPARATUS

[75] Inventor: Hideo Ryuu, Nogata-gun, Japan

[73] Assignee: Usui Kokusai Sangyo Kaisha Ltd., Japan

[21] Appl. No.: 637,918

[22] Filed: Apr. 25, 1996

[30] Foreign Application Priority Data

Apr. 27, 1995 [JP] Japan ............................... 7-127116

[51] Int. Cl.⁶ .................................................. F16D 31/00
[52] U.S. Cl. ................................ 192/58.681; 192/82 T; 192/103 F
[58] Field of Search ........................ 192/58.681, 82 T, 192/103 F

[56] References Cited

U.S. PATENT DOCUMENTS

| | | | |
|---|---|---|---|
| 2,879,755 | 3/1959 | Weir | 123/41.12 |
| 3,259,221 | 7/1966 | Godfrey | 192/58 B |
| 3,262,528 | 7/1966 | Weir | 192/82 T |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,840,101 | 10/1974 | Peter et al. | 192/58 B |
| 3,856,122 | 12/1974 | Leichliter | 192/41.12 |
| 3,893,555 | 7/1975 | Elmer | 123/58 B |
| 3,949,849 | 4/1976 | Hammer | 192/82 T X |
| 3,964,582 | 6/1976 | Mitchell | 192/58 B |
| 3,983,981 | 10/1976 | Snodgrass et al. | 192/82 T X |
| 4,007,819 | 2/1977 | Maci | 192/58.681 |
| 4,635,625 | 1/1987 | Neugebauer | 192/58.681 |
| 4,667,792 | 5/1987 | Hauser | 192/58.681 |
| 4,699,258 | 10/1987 | Johnston et al. | 192/58 B |
| 4,732,249 | 3/1988 | Brunken | 192/82 T X |
| 4,735,300 | 4/1988 | Brown | 192/82 T X |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikawa et al. | 123/41.12 |
| 5,018,612 | 5/1991 | Takikawa et al. | 192/58 B |
| 5,060,774 | 10/1991 | Takikawa et al. | 192/58 A |
| 5,090,533 | 2/1992 | Inoue | 192/58 B |
| 5,101,949 | 4/1992 | Takikawa et al. | 192/58 B |
| 5,109,965 | 5/1992 | Inoue | 192/58 B |
| 5,119,920 | 6/1992 | Inoue | 192/58 B |
| 5,125,491 | 6/1992 | Takikawa et al. | 192/58 B |
| 5,139,125 | 8/1992 | Takikawa et al. | 192/58 B |
| 5,232,074 | 8/1993 | Watanabe | 192/58 B |
| 5,404,977 | 4/1995 | Martin et al. | 192/82 T X |
| 5,452,782 | 9/1995 | Inoue . | |
| 5,501,183 | 3/1996 | Takayama . | |

FOREIGN PATENT DOCUMENTS

| | | | |
|---|---|---|---|
| 54-25581 | 8/1979 | Japan . | |
| 55-76226 | 6/1980 | Japan . | |
| 57-1829 | 1/1982 | Japan | 192/82 T |
| 57-167533 | 10/1982 | Japan . | |
| 57-179431 | 11/1982 | Japan . | |
| 62-124330 | 6/1987 | Japan . | |

Primary Examiner—Rodney H. Bonck
Assistant Examiner—Saúl J. Rodríguer
Attorney, Agent, or Firm—Anthony J. Casella; Gerald E. Hespos; Ludomir A. Budzyn

[57] ABSTRACT

A hydraulic fan coupling comprises a hermetically sealed case that is driven by the engine. The case is made of metal. Fan blades made of resin are molded onto elongated outer portions of the case.

4 Claims, 4 Drawing Sheets

PRIOR ART

HYDRAULIC FAN COUPLING APPARATUS

BACKGROUND OF THE INVENTION

1. Field of the Invention

The present invention, in a fan coupling apparatus for supplying to an engine an amount of cooled air that is always automatically adjusted according to the running state of a vehicle, and for controlling according to changes in revolution or in the temperature of the surrounding external environment the rotation of a fan for cooling an engine in a common automobile or other vehicle, relates to a hydraulic fan coupling apparatus comprising especially a fan member entity that is directly united with a hermetically sealed case.

2. Description of the Related Art

In general, conventional fan coupling apparatuses of this type, as shown in FIG. 4 and FIG. 5, are comprised of a fan member F—either formed from metallic fan blades 20' that are riveted to a star-shaped, steel-plate spider 20 (FIG. 4), or from plastic fan blades 21' that are molded onto the external portions of a round plate-shaped, steel-plate insert 21—that is separately attached by bolts via the spider portion or the insert portion into a hermetically sealed case that is the driven side of the fan coupling apparatus.

However, with these types of prior art fan coupling apparatuses, there are many problems, including the fact that the above-described separately formed fan member F requires press molding of the spider 20 or of the insert 21; moreover, the work of attaching this fan member to the hermetically sealed case increases the amount of labor required. At the same time, the increased load on the bearing portion—due to the cantilevered bearing support—that accompanies the increased weight on the driven side is a cause of early abrasion, and can easily result in unwanted shaking (rattling) of the apparatus. In addition, productivity is undesirably lowered due to the fact that a dynamic balance adjustment must be performed not only for the fan member unit itself, but, following the attachment of the fan member to the hermetically sealed case, another dynamic balance adjustment must be performed for the finished product.

SUMMARY OF THE INVENTION

The present invention, bearing in mind the above-mentioned problems of the prior art, has been designed to provide a hydraulic fan coupling apparatus that, with the goal of improving productivity and dramatically reducing the labor required to make it, is configured such that the fan member is set directly onto either the case or the case cover that comprise the hermetically sealed case so that they form a single entity. In this way, there is absolutely no need, as in the prior art, to use a spider 20 or an insert 21, neither is there any need to press mold such parts or to attach them. At the same time, there is reduced weight on the driven side, and the load on the bearing is reduced to a minimum, and there is no problem with early shaking. Moreover, as there is no need for the previously mentioned spider or insert, neither is there a need to perform a dynamic balance adjustment of the fan member unit.

In order to accomplish the above-mentioned goals, the present invention, in a fan coupling apparatus for controlling rotational torque transfer from the driving side to the driven side by increasing and decreasing the efficient contact area of the oil within the torque transfer gap section between the driving side and the driven side, relates to a hydraulic fan coupling apparatus comprised such that either the case or the case cover that comprise the hermetically sealed case that is the previously mentioned driven side is made of a metallic plate, and each of the fan blades of the fan member is directly attached to the elongated portions of the outside portions of this metallic plate that have been elongated, so as to remain part of the metallic plate, towards its exterior. Moreover, the fan blades that comprise the above-mentioned fan member are made of metal or of plastic.

Because the present invention is comprised in such a way, productivity is improved and the labor required to make the apparatus is dramatically reduced, since the fan member is directly set onto either the previously described case or case cover. In this way, there is absolutely no need to use a separate spider or an insert, or to press mold such parts or to attach them; at the same time, since there is reduced weight on the driven side, the load on the bearing is reduced to a minimum, and there is no problem with early shaking. Moreover, as there is no need for the previously mentioned spider or insert, neither is there a need to perform a dynamic balance adjustment of the fan member unit.

DETAILED DESCRIPTION OF THE PREFERRED EMBODIMENTS

Figure 1:
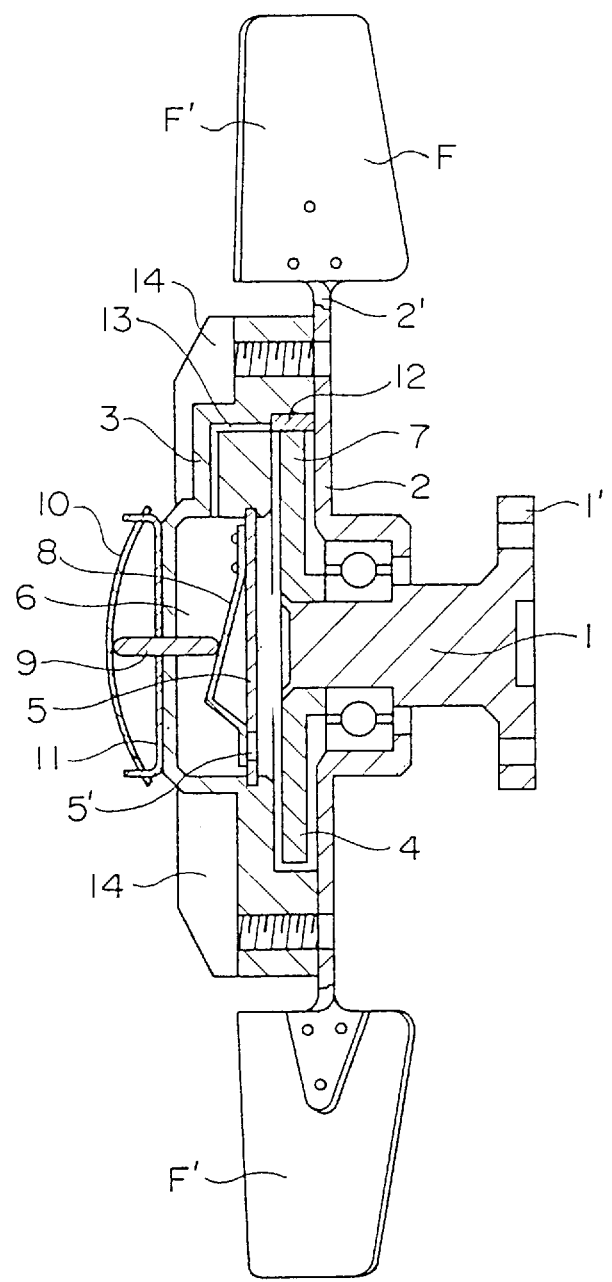
FIG. 1 is a profile (longitudinal section) drawing of a hydraulic fan coupling apparatus (thermal module type) of the present invention.

Below, preferred embodiments of the present invention will be explained based on FIGS. 1–3. In these drawings, the same numbers are used to identify identical parts. The rotational axis 1 serves as the driving side; it possesses a driving disk 7 that is attached to its front portion, and a flange wall 1' on its back portion for attaching it to its counterpart base. On the upper portion of this rotational axis is a bearing support that supports via a bearing the hermetically sealed case that is the driven side, itself comprising a case 2 and a case cover 3 that are the coupling apparatus. The divider plate 5 divides the torque transmission chamber 4 that incorporates the above-described driving disk 7 from the oil collection chamber 6 that is the internal portion of the hermetically sealed case. This divider plate is provided with an oil supply adjustment hole 5' for providing oil from the oil collection chamber 6 to the torque transmission chamber 4. Also, the above-described drive disk 7 is located within the torque transmission chamber 4, and it maintains a minute gap for torque transmission with the opposite wall surface which makes part of the hermetically sealed case.

Figure 2:
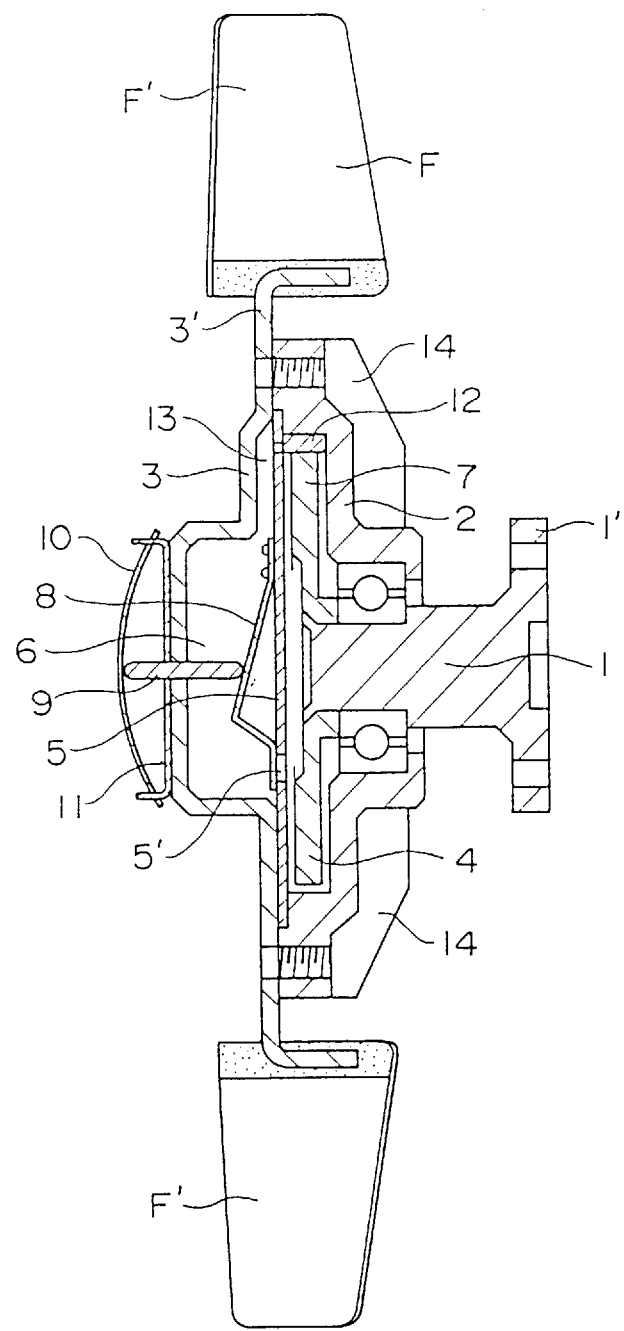
FIG. 2 is a drawing equivalent to that of FIG. 1 of another preferred embodiment of the present invention.

The valve member 8 is provided internally in the thermal module type as shown in FIG. 1 and FIG. 2. This valve member 8 opens and closes the supply adjustment hole 5'; one side of this valve member is riveted to the divider plate 5, and the other side is located at the just-mentioned adjustment hole. This valve member 8 senses changes in the external surrounding temperature via the temperature sensing element 10, which is made from a plate-shaped bimetal, and which supports both ends (but not the middle) of the support fitting 11 on the front surface of the above-described cover 3; when this temperature exceeds a prescribed value, this valve member 8 opens the above-described adjustment hole 5'; likewise, when this temperature falls below the prescribed value, the valve member 8 causes—as the result of a closing—linkage via the linkage entity 9—the adjustment hole 5' to close. In this way, the efficient contact area of the oil within the torque transmission chamber 4 is increased and decreased, and the rotational torque transmission from the rotational axis 1 of the driving side to the hermetically sealed case of the driven side is thereby controlled.

The dam 12 is provided between the outer face of the drive disk 7, where oil collects due to centrifugal force during rotation, and that portion of the inner wall of the hermetically sealed case that is opposite to this outer face of the drive-disk 7. This dam 12 performs a pumping function via the discharge circulation route 13 from the discharge mouth—which is linked to the torque transmission chamber 4—side, and which is formed so as to neighbor the front side (in the rotational direction) of this dam—to the oil collection chamber 6—side.

Figure 3:
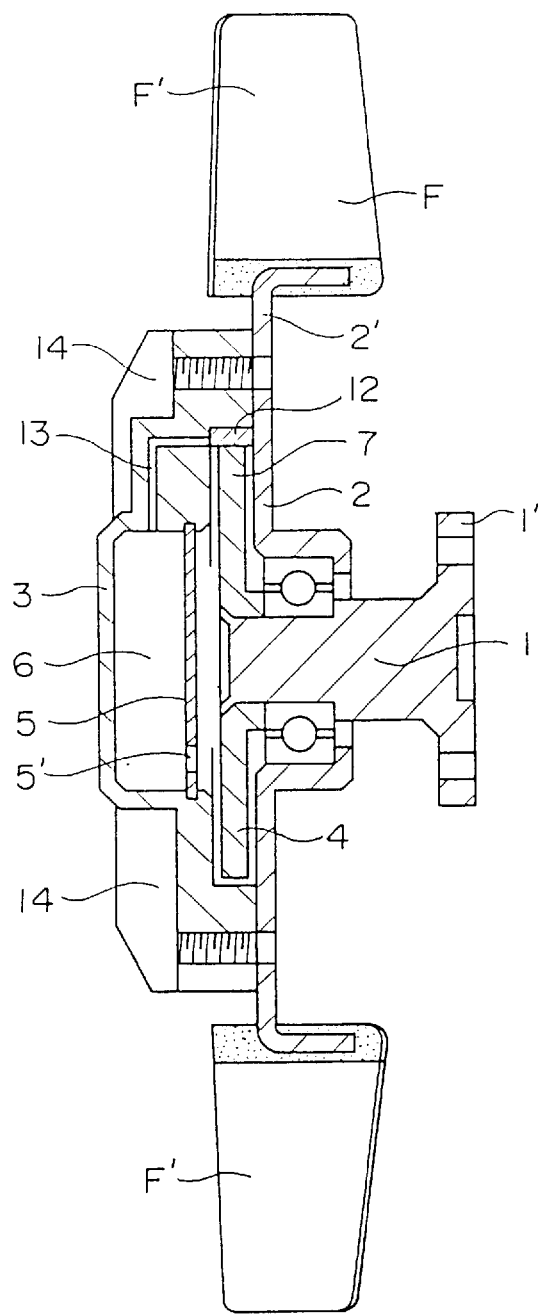
FIG. 3 is a profile drawing of another hydraulic fan coupling apparatus (torque limit type) of the present invention.
Figure 4:
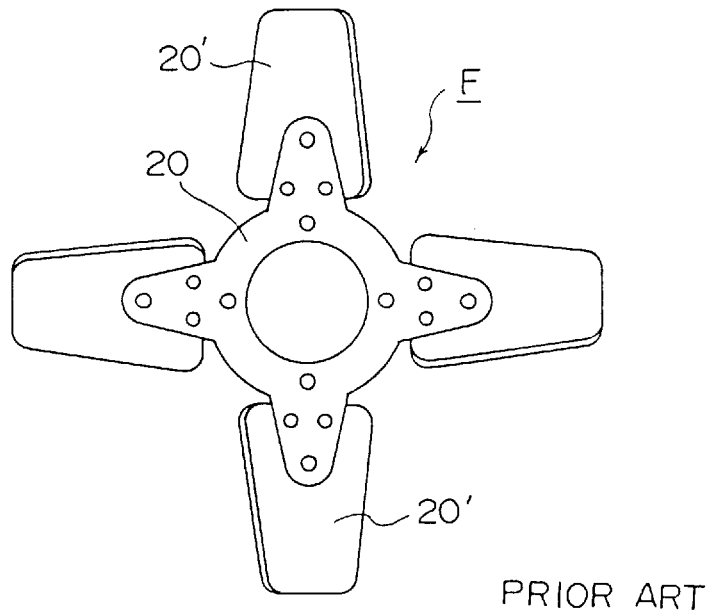
FIG. 4 is a plane drawing of a fan member unit for attaching to a prior art hydraulic fan coupling apparatus.
Figure 5:
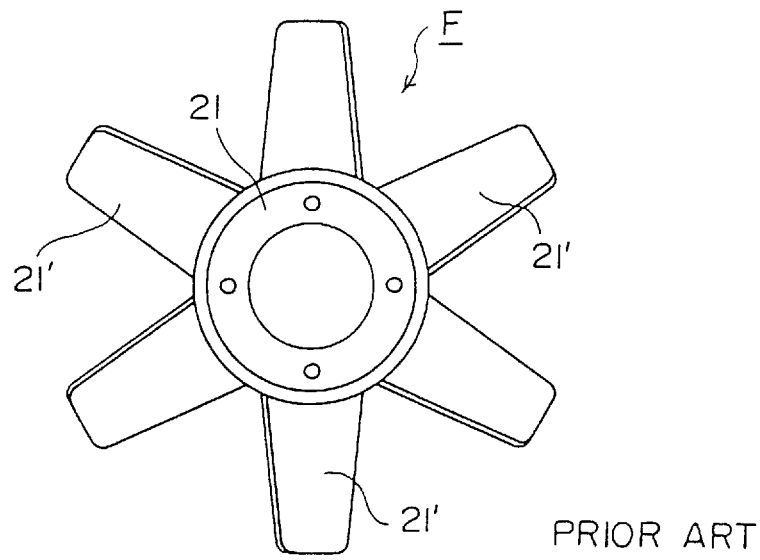
FIG. 5 is a plane drawing of another prior art fan member unit.

The fan member F may be made of metal, as in FIG. 1, or of plastic, as in FIG. 2 and FIG. 3; it is comprised such that each of its fan blades F' are directly attached by riveting (FIG. 1) or by molding (FIG. 2 and FIG. 3), etc., to extended portions 2', 3' that are uniform extensions of either the previously described case 2 or the case cover 3, respectively, that serve as the hermetically sealed case of the driven side; the case 2 or the case cover 3 that has been extended is formed through press molding of a metal plate that is a galvanized steel plate, an aluminum alloy plate, a stainless steel plate, a titanium plate, or a titanium alloy plate, etc. Meanwhile, the number 14 identifies the cooling fan.

With the above-described configuration, since the case side 2 that is supported by the bearing may, if desired, be a metal plate, if an interference setting is selected after considering the thermal expansion rate of both the case 2 and the bearing, creep at the bearing may be prevented. Also the assembly, molding, etc., of the fan member F may be performed before or after assembling the hydraulic fan coupling apparatus.

With the above-described hydraulic fan coupling apparatus of the present invention, with the configuration that has the above-mentioned fan member F directly attached by riveting or molding, etc., to the extended portions of either the case 2 or the case cover 3 (that comprise the hermetically sealed case) that has been made from metal and extended from the outer portions to the outside in a manner that the extended portions are still uniform with the respective case 2 or the case cover 3, an extremely useful hydraulic fan coupling apparatus is provided: among other things, productivity is improved and the labor required to make the apparatus is dramatically reduced, since there is absolutely no need to use a separate spider or an insert as the fan member, or to press mold such parts or to attach them; at the same time, since there is reduced weight on the driven side, the load on the bearing is reduced to a minimum, and there is no problem with early shaking. Moreover, as there is no need for the previously mentioned spider or insert, neither is there a need to perform a dynamic balance adjustment of the fan member entity.

What is claimed is:

1. A hydraulic fan coupling apparatus for an engine, said apparatus comprising:

a driving side having a driving disk and means for mounting said driving side to the engine for rotation of the driving side about a rotational axis; and a driven side comprising a metal case hermetically and rotatably sealed to portions of said driving side such that said case is rotatable relative to said driving side about said rotational axis, said case enclosing said driving disk and being formed such that a torque transfer gap is defined intermediate said case and said driving disk, said case comprising a plurality of elongated portions unitary with portions of said case and extending away from the rotational axis, said case further including blade mount portions unitary with said respective elongated portions and at locations remote from said rotational axis, said driven side further comprising a plurality of resin fan blades, each said resin fan blade having a case mount portion molded respectively onto the blade mount portions of the metal case such that said case mount portion of each said resin fan blade surrounds and engages one of the blade mount portions of the metal case.

2. The fan coupling apparatus of claim 1, wherein the metal of the case is selected from the group consisting of galvanized steel, aluminum alloy, stainless steel, titanium and titanium alloy.

3. The fan coupling apparatus of claim 1, wherein the blade mount portions of the case are angularly aligned to the elongated portions.

4. The fan coupling apparatus of claim 3, wherein the blade mount portions of the case are aligned substantially parallel to the rotational axis.

* * * * *